United States Patent [19]

Mastrangelo

[11] 3,926,916

[45] Dec. 16, 1975

[54] DIELECTRIC COMPOSITION CAPABLE OF ELECTRICAL ACTIVATION

[75] Inventor: Sebastian Vito Rocco Mastrangelo, Hockessin, Del.

[73] Assignee: E. I. Du Pont de Nemours & Company, Wilmington, Del.

[22] Filed: Dec. 22, 1972

[21] Appl. No.: 317,381

[52] U.S. Cl. .............. 252/63.5; 317/234 V; 338/20

[51] Int. Cl.$^2$ .......................... H01B 3/12; H01B 3/30

[58] Field of Search ...................... 252/63.5; 338/20; 317/234 V

[56] References Cited

UNITED STATES PATENTS

| | | | |
|---|---|---|---|
| 2,716,190 | 8/1955 | Baker | 252/63.5 |
| 2,892,139 | 6/1959 | Salzberg | 252/63.5 |
| 2,944,993 | 7/1960 | Brebner et al. | 260/37 |
| 3,079,289 | 2/1963 | George, Jr. et al. | 252/63.5 |
| 3,287,311 | 11/1966 | Edwards | 260/37 |
| 3,359,521 | 12/1967 | Lew et al. | 338/20 |
| 3,407,495 | 10/1968 | Montgomery | 29/610 |
| 3,685,026 | 8/1972 | Wakabayashi et al. | 338/20 |
| 3,685,028 | 8/1972 | Wakabayshi et al. | 340/173 |

OTHER PUBLICATIONS

Sie, "Memory Cell Using Bistable Resistivity in Amorphous As–Te–Ge Film" Thesis, Iowa State U. May, 1969.

Swyers et al., SCTM 293–60–52 "Feasibility of an Electrically Activated Miniature Switch" Aug. 1960.

*Primary Examiner*—Benjamin R. Padgett
*Assistant Examiner*—B. H. Hunt

[57] ABSTRACT

A dielectric composition, and layered structure thereof, comprising a dielectric polymeric binder, for example, a polyimide having a glass transition temperature of at least 100°C., and normally dielectric filler particles having smooth rounded edges, for example, spheroidal or nodular non-conductive aluminum particles, dispersed therein, which composition is capable of becoming conductive on exposure to an activating potential.

8 Claims, No Drawings

DIELECTRIC COMPOSITION CAPABLE OF ELECTRICAL ACTIVATION

BACKGROUND OF THE INVENTION

1. Field of the Invention

This invention relates to dielectric compositions which can be made conductive by activation.

2. Description of the Prior Art

Electrical treatment of compositions containing dispersed metal particles in an insulating polymeric binder to prepare low resistance coatings and conductive electrode layers in which there is intimate electrical connection between particles is known in the art, as represented by U.S. Pat. Nos. 2,321,587 and 2,819,436. It is desirable under certain circumstances to form, instead of an integral conductor, a multiplicity of separate conductive paths that are mutually isolated from each other so that each path can be used as a connective element, as in a read-only memory for a computer. The pattern of such conductive paths can thereby form addressing circuitry for computer input or output. For such use, it is important that the various conductive paths do not interconnect (cross-talk) during their formation. The problem of how to achieve mutually isolated paths when such paths are formed close together becomes a concern when preparing patterns of conductive paths compatible with laminated layers of high density microcircuitry. To achieve maximum density, the geometrical configuration of a path becomes critical. Two types of electrically conducting structures have been recognized; (1) a spatial type in which chains of particles are highly interconnected in a three dimensional network, and (2) a bridge type in which a conductive chain of particles appears to form along a single electrical breakdown path. Hypothetical structures containing multiple bridge type conducting paths side-by-side without interconnection have been subjected to theoretical analysis, for example, as shown in Kolloidnyi Zhurnal, Vol. 28, No. 1, pages 62–68, January-February, 1967.

SUMMARY OF THE INVENTION

It is an object of this invention to provide a normally insulative (dielectric) composition comprising a dispersed potentially conductive particulate filler and a polymeric binder, which composition can provide closely spaced, electrically conductive paths when subjected to suitable electrical treatment. It is a further object to provide a novel structure which is suitable for use as a read-only memory and in which the closely spaced, electrically conductive paths which are formed by such electrical treatment are mutually isolated, thereby preventing cross-talk.

In summary, the present invention resides in a dispersed filler-polymeric binder composition comprising a dielectric polymeric binder component and a normally dielectric particulate filler component dispersed therein, which composition is capable of becoming conductive on exposure to an activating potential, said particulate filler component containing a substantial fraction of particles having smooth rounded edges. The invention also resides in such a composition which, in layered form, upon electrical activation, provides a multiplicity of closely spaced, electrically conductive, isolated paths through the layer. The electrical activation can be carried out on thin layers of the composition by affixing multiple pairs of opposed, spaced apart electrodes and applying electrical voltages exceeding a characteristic breakdown potential to adjacent pairs of the electrodes. Such layered structures are useful in addressing circuitry in read-only memories by insuring freedom from cross-talk and reliability of operation in the addressing function.

DETAILED DESCRIPTION OF THE INVENTION

The invention herein resides in the above-described composition and in layered structures formed therefrom. Broadly, the polymeric binders may be chosen from many classes of organic polymers. The polymer should have a glass transition temperature ($T_g$) of at least 40°C., preferably at least 100°C., it must be unreactive with the filler particles and it must be capable of withstanding the thermal stress which is applied during the manufacture of the system of which it is a part. The binder materials used in the composition of this invention can include small amounts of solvent and other materials which may slightly reduce their glass transition temperatures, but to no lower than 40°C., by acting as plasticizers. Typical examples of organic polymers that have $T_g$ values of at least 40°C. can be selected from the well known polyolefins, polyvinyl derivatives, polybenzimidazoles, polyesters, polysiloxanes, polyurethanes, aromatic polyimides, poly(amide-imides), poly(ester-imides), polysulfones, polyamides, polycarbonates, polyacrylonitriles, polymethacrylonitriles, polymethyl methacrylates, polystyrenes, poly($\alpha$-methylstyrenes) and cellulose triacetates. Representative members of these classes and their $T_g$ values are listed in Table I. Generally, the higher the $T_g$ the more thermally stable the polymer is as a binder in the composition. This generally may not be true if there is a degradative interaction between the polymer and the metal filler particles, for example, as is the case with cobalt particles and polyimides. Generally, too, the higher the $T_g$ the longer the life of the low resistance activated state. Extensive data on $T_g$ values are available in the art.

TABLE I

| Organic Polymers | Tg(°C.) |
|---|---|
| Aromatic polyimide (DAPE-PMDA) | 380 |
| Aromatic poly(amide-imide) (MAB/PPD-PMDA) | 265 |
| Aromatic polysulfone | 190 |
| Polyurethane | 150 |
| Polycarbonate | 150 |
| Polydecamethylene azelamide | 149 |
| Aromatic polyamide (70% IP/30% TP-MPD) | 130 |
| Polyacrylonitrile | 130 |
| Poly($\alpha$-methylstyrene) | 130 |
| Polymethacrylonitrile | 120 |
| Polymethyl methacrylate | 105 |
| Cellulose triacetate | 105 |
| Polystyrene | 100 |
| Polyvinyl formal | 81–108 |
| Polyacrylic acid | 80–105 |
| ABS polymer (Acrylonitrile/Butadiene/Styrene) | 95 |
| Polyvinyl alcohol | 85 |
| Polyindene | 85 |
| Polyvinylcarbazole | 84–85 |
| "Glyptal" alkyd resin | 83–87 |
| Hard Rubber | 80–85 |
| Polyvinyl chloride | 82 |
| Polyethylene terephthalate | 80 |
| Poly(vinyl chloride/vinyl acetate), 95:5 | 71 |
| Cellulose acetate | 69 |
| Polyethyl methacrylate | 65 |
| Poly(vinyl chloride/vinyl acetate), 88:12 | 63 |
| Nylon 66 | 57 |
| Poly(vinyl chloride/vinyl stearate), 90.3:9.7 | 56 |
| Poly-p-xylene | 55 |
| Poly(vinylidene chloride/vinyl chloride) | 55–75 |
| Polypseudocumene | 55 |
| Polyvinyl pyrrolidone | 54 |
| Cellulose trinitrate | 53 |
| Cellulose acetate-butyrate | 50 |

TABLE I-continued

| Organic Polymers | Tg(°C.) |
|---|---|
| Polycaprolactam | 50 |
| Polyvinyl butyral | 49 |
| Polyhexamethylene sebacamide | 47 |
| Polychlorotrifluoroethylene | 45 |
| Ethyl cellulose | 43 |
| Poly(styrene/butadiene) 85:15 | 40 |

DAPE = diaminodiphenyl ether
PMDA = pyromellitic dianhydride
MAB = m-aminobenzoic acid
PPD = p-phenylenediamine
IP = isophthaloyl chloride
TP = terephthaloyl chloride
MPD = m-phenylenediamine In addition to the previously described organic polymers, certain thermosetting crosslinked organic polymers are operable herein as binders. Characteristics of thermosetting crosslinked polymers include low solubility in solvents, high melting points and a three dimensional aggregation of the individual polymeric chains. Examples of such polymers include thermosetting epoxy resins, unmodified or modified (preferably modified with a diamine).

Aromatic polyimides having a $T_g$ of at least 100°C., preferably at least 150°C., represent a preferred class of polymers which are useful herein as binders. Such polyimides and their preparation are well known in the prior art, for example, as shown by U.S. Pat. Nos. 3,179,630; 3,179,631; 3,179,632; 3,179,633; 3,179,634; and 3,287,311. Useful polyimides can be represented by the formula

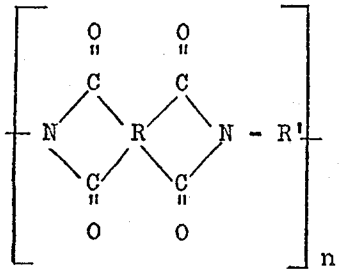

wherein $n$ is an integer sufficiently large to provide the desired polymer $T_g$, R is a tetravalent radical derived from an aromatic tetracarboxylic acid dianhydride, the aromatic moiety having at least one ring of six carbon atoms and characterized by benzenoid unsaturation, and R′ is a divalent radical derived from a diamine. Aromatic tetracarboxylic acid dianhydrides which are useful for preparing operable polyimides include those wherein the four carbonyl groups of the dianhydride are each attached to separate carbon atoms in a benzene ring and wherein the carbon atoms of each pair of carbonyl groups are directly attached to adjacent carbon atoms in a benzene ring. Examples of dianhydrides suitable for forming polyimide binders include pyromellitic dianhydride; 2,3,6,7-naphthalenetetracarboxylic dianhydride; 3,3′,4,4′-diphenyltetracarboxylic dianhydride; 1,2,5,6-naphthalenetetracarboxylic dianhydride; 2,2′,3,3′-diphenyltetracarboxylic dianhydride; 2,2-bis(3,4-di-carboxyphenyl)propane dianhydride; bis(3,4-dicarboxyphenyl)-sulfone dianhydride; and 3,4,3′,4′-benzophenonetetracarboxylic dianhydride.

Organic diamines which are useful in the preparation of operable polyimides include those which are represented by the formula $H_2N\text{-}R'\text{-}NH_2$ wherein the divalent radical R′ is selected from aromatic, aliphatic, cycloaliphatic, combinations of aromatic and aliphatic, and heterocyclic radicals and bridged organic radicals wherein the bridge atom is carbon, oxygen, nitrogen, sulfur, silicon or phosphorus. R′ can be unsubstituted or substitued, as is known in the art. Preferred R′ radicals include those which contain at least six carbon atoms and are characterized by benzenoid unsaturation, for example, p-phenylene, m-phenylene, biphenylylene, naphthylene and

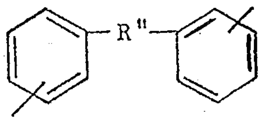

wherein R″ is selected from alkylene or alkylidene having 1–3 carbon atoms, O, S and $SO_2$.

The diamines described above also can be used in the formation of operable polyamide binders. Among the diamines preferred in the formation of polyamide and polyimide binders are m-phenylenediamine; p-phenylenediamine; 2,2-bis(4-aminophenyl)propane; 4,4′-diaminodiphenylmethane; benzidine; 4,4′-diaminodiphenyl sulfide; 4,4′-diaminodiphenyl sulfone; 3, 3′-diaminodiphenyl sulfone; and 4,4′-diaminodiphenyl ether.

As disclosed in the prior art, some polyimides are not easily fabricatable because of their high melting points. With such polyimides, the metal particles which are required in the composition of the present invention are introduced during the preparation of the polyimide. For example, they can be added to the polyamic acid, a fabricatable intermediate in the formation of the polyimide. As is well known, the polyamic acid can be dissolved in a suitable carrier solvent. Employing such techniques, the metal particles can be dispersed in a polyamic acid in a carrier solvent, the amounts of polyamic acid and metal particles being such that upon conversion of at least part of the polyamic acid to polyimide and removal of at least part of the carrier solvent, there will be produced the previously described polyimide-metal particle composition. Such polyamic acid-carrier solvent-metal particle compositions possess dielectric characteristics and can be shaped as desired prior to the conversion of polyamic acid to polyimide and removal of carrier solvent.

A particularly preferred polyimide binder having a $T_g$ of about 380°C. (by measurement of electrical dissipation factor) can be prepared from 4,4′-diaminodiphenyl ether and pyromellitic dianhydride by employing the precursor polyamic acid in N-methyl-2-pyrrolidone ( available commercially as "PYRE-M.L." Wire Enamel RC-5057). The polyimide produced from such a polyamic acid and having aluminum particles dispersed in it can withstand a temperature of 450°C. for short periods of time and it can withstand continuous use at 220°C.

Aromatic polyamides having the requisite $T_g$ represent another class of preferred organic polymers for use as a binder in this invention. Such polymers are disclosed in U.S. Pat. Nos. 3,006,899; 3,094,511; 3,232,910; 3,240,760; and 3,354,127. One such polymer which is useful herein can be represented by the formula $\text{-}COC_6H_4CONHC_6H_4NH\text{ -}_n$ wherein n is an integer sufficiently large to provide the desired polymer $T_g$. Particularly preferred is a polymer of such formula wherein the —$COC_6H_4CO$— units are isophthaloyl and/or terephthaloyl units and the —$NHC_6H_4NH$— units are m-phenylenediamine units. One such particularly preferred aromatic polyamide binder can be obtained by reaction of essentially equimolecular quantities of m-phenylenediamine and phthaloyl chloride, the phthaloyl chloride being a mixture of about 70 mole % isophthaloyl chloride and 30 mole % terephthaloyl chloride. Such a polymer having a $T_g$ of 130°C. is thermally stable at 300°C. for significant time periods and it conveniently can be handled as a solution of the polyamide containing dispersed metal powder in the formation of layered compositions.

The filler particles which are used in the composition of this invention are non-conductive, but are capable of becoming conductive upon exposure to an activating electrical potential, and they are characterized by having smooth rounded edges along their surfaces. Before activation, electrical contact resistance blocks the passage of electrical current from one particle to another if they are touching within the polymeric binder. Generally, the particles have an electrically conductive interior and a dielectric surface that provides contact resistance when the particles touch so that conductive paths are not formed by the interconnection of particles in the binder. Upon electrical activation, the dielectric surface breaks down and is no longer effective in providing contact resistance between particles, thus allowing electrical contact between particles along a bridge type path. The electrically conductive interior of a filler particle can be a metal or a semiconductor. The state of conductivity may be fully conductive ($10^{-6}$ to $10^{-3}$ ohm-cm.) or semiconductive ($10^{-3}$ to $10^{+9}$ ohm-cm.). Usually, metals are employed to achieve highly conductive bridge paths, whereas semiconductor particles are sometimes useful when characteristic semiconductor properties, such as a negative temperature coefficient of resistance, are desired.

The dielectric surface that makes a filler particle nonconductive can be formed by coating the surface of the particulate material with an insulative chemical compound of the metal being coated, such as an oxide, sulfide or nitride of the metal. Readily obtained metals carrying an oxide coating that renders the aggregate of particles in the binder electrically insulative are aluminum, antimony, bismuth, cadmium, chromium, cobalt, indium, lead, magnesium, manganese, moylbdenum, niobium, tantalum, titanium and tungsten. A preferred metal is aluminum with a tarnish film of insulative aluminum oxide which is readily formed by exposure to ambient atmospheric conditions. Suitable semiconductors which are readily oxidizable to carry an insulating oxide film are silicon and selenium.

The metals and semiconductors which can be employed in the composition of this invention are in the form of spheroidal or nodular shaped particles having smooth rounded edges. Such particle shapes are readily recognized by those skilled in the art as comprising two of the five art recognized particle groups for classifying pigmentary, including metal, particles with respect to shape, namely, spheroidal, cubical, nodular, acicular and lamellar. In order to select particles having shapes suitable for the composition of this invention it is only necessary to distinguish between the characteristics of the spheroidal and nodular groups and the other three classification groups which have in common corners or sharp edges on the particles. The cubical shape is a common crystalline form having sharp edges. Acicular shapes are at least several times longer than their smallest diameter and resemble a needle or a rod. The lamellar shapes are extremely thin plates or flakes that sometimes overlap or leaf to form an almost continuous layer. Classification is routinely carried out by visual inspection under a microscope or by scanning electron microscope photographs. Other means based on greater tapping density, reduced viscosity in liquid suspension or greater mobility in electrical feeder-vibrator tests may sometimes be used to distinguish and even separate particles with smooth rounded edges from particles that have corners or sharp edges.

The inherent shape due to the natural crystalline form of a specific metal can be modified by certain known processes to produce spheroidal or nodular particles. Metal particles, in general, can be wet ground to produce particles having smoother or rounder edges than those produced by dry grinding. Powdered solids can be reduced in particle size and made round by means of a "Micronizer" mill comprising a circular chamber. The solids are injected into the mill using compressed air or high pressure steam so that the particles hit each other at very high speed. The fines are carried out through an opening in the center of the mill and are usually smoother and more uniform than those obtained by either wet or dry grinding. Such grinding processes are useful in producing spheroidal metal particles and, when applied to certain metals that are easy to fracture because of their crystalline form, for example, relatively brittle antimony or bismuth, they are useful in producing nodular or rounded irregularly shaped particles by a combination of fracturing and grinding.

If the melting point of the appropriate metal is sufficiently low, spheroidal or nodular particles can be prepared by atomization of the molten metal followed, usually, by screening to control the particle size. Atomized powders of aluminum tend to be nodular but, depending upon the atomization conditions and subsequent handling, they can be produced in a spheroidal shape. Powdered metals which are characterized by a smooth spherical configuration are commercially available. Such powders provide a high packing density and they simplify the dispersing of the metal in the polymeric binder.

Not all the particles of the filler need be smooth edged and mixtures of smooth edged and sharp edged particles can be used. As little as 30%, preferably at least 50%, by weight of smooth edged particles in the particulate filler is effective to substantially prevent cross-talk from occurring between the spaced apart conductive paths formed by activating the composition of this invention. More preferably, substantially all, that is, about 100%, of the particles should be smooth edged to avoid the possibility of cross-talk.

The average size of filler particles useful in this invention is in the range of about 0.01–1,000 microns. The thinner the thickness of the layered composition desired, the finer should be the particle size. Particles having an average size of about 20 microns represent a preferred size. Particles which are black in color, that is, have a particle size that is smaller than the visible wavelength of light, are most preferred. The size of such particles is about 0.01–0.5 micron. Smaller particles limit the conductivity which can be obtained by subjection of the dielectric composition to an activating voltage and larger particles limit the mechanical strength of the composition and the degree of smoothness of the surface which can be obtained in a layered composition. For preferred compositions, particle shapes can range from commercially available cigar shaped (nodular) particles, with no sharp edges evident in a typical stereoscan electron microscope photograph, to essentially spherical particles with smooth rounded contours. Readily available nodular particles include those which pass a 100-mesh, 200-mesh or 325-mesh sieve (U.S. Sieve Series).

The filler particles are present in the composition of this invention in an amount which is sufficient to achieve electrical activation which is marked by a sudden initial transition to a state of low resistance; the amount should not be so large that the physical strength of the binder is adversely affected. The necessary amount of metal particles is 35–90 volume %, 45–85 volume % being preferred; this normally includes the amount required for square close packing of the particles in the binder, an arrangement in which the particles are each surrounded by four other particles of the same size as the nearest neighbors. Particularly preferred is an arrangement that provides closest particle-to-particle approach and, therefore, the state of lowest resistance upon electrical activation. For the preferred aluminum particles about 45–85 volume % corresponds to about 67–95 weight %. Such a composition thus comprises about 67–95 weight % of aluminum particles and, the balance to achieve 100 weight %, about 5–33 weight % of polymeric binder. Small amounts of non-interfering materials may be present. Amounts of aluminum below 67% may provide insufficient range of electric current regulation and may present too much electrical resistance. Amounts above 95% may make the composition crumbly and may make the surface of a layered composition uneven. Corresponding proportions by weight of other kinds of particles will vary with particle distribution, shape and density but they are readily determined by one skilled in the art.

The normally insulative composition of this invention is a form-retaining solid by virtue of the stiffness of the binder material employed. The solid can be in any of several physical forms. For example, it can be a coating, film or sheet on any suitable non-conducting support or it can be a self-supporting film or sheet of regular or irregular shape. The composition can be formed by employing known ways for homogeneously dispersing a filler component in a polymeric binder component. Known methods also can be employed to convert the composition to a layer of any desired thickness and shape. For example, a coating can be applied to a substrate by painting, spraying, dipping or other conventional technique involving evaporative drying. If the polymeric binder is readily meltable, a layered structure can be made by casting or extruding onto a substrate a polymer melt containing dispersed metal particles. Alternatively, a film of the composition can be case on a support and stripped therefrom.

As already indicated above, when a high melting polimide is employed as the binder, it may be more conveniently handled as its polyamic acid precursor dissolved in a suitable solvent. Such a polyamic acid solution can be employed in the aforesaid layer-forming procedure. The polyamic acid solvent should strongly associate with both the polyamic acid and the polyimide polymer that is subsequently produced and it should be removable by volatilization. Suitable solvents include N,N-dimethylformamide, N,N-dimethylacetamide, dimethyl sulfoxide, N-methyl-2-pyrrolidone and tetramethyl urea. After being converted to a layered structure, the polyamic acid can be readily converted to a polyimide in situ by heating to effect ring closure with elimination of water; at the same time the carrier solvent is volatilized off.

As stated above, the composition of this invention generally is disposed as a layer; the shape and dimensions thereof are not critical since its intended function when it is transformed into an electrically conductive element depends not on its bulk but on its ability to form wire like internal paths of low resistance between closely spaced pairs of opposed electrode contacts on the same or opposite sides of the layered composition. Layer thickness will vary with the particular use and usually will be in the range of about 0.1-10,000 microns, more usually 100–2,000 microns.

The composition disposed as a layer has an electrical resistance of at least $10^8$ ohms and is typically over $10^{10}$ ohms between area electrodes. Such a composition can be made conductive by passage of an electrical current of sufficient strength to create a conductive path through the dispersed filler particles. Conductivity testing and activation capability can be carried out using two test electrodes. By application of an activating voltage pulse through a protective series resistor, specific resistance values can be attained, in the range of about 1–250,000 ohms. The activating voltage should be sufficient to exceed the threshold value needed to burn through the particle insulating coating and create conductive links between particles along the path between the opposed electrodes. Normally, a pulse of 150–400 volts is effective for this purpose. Once a conductive path has been established, its resistance should remain essentially unchanged during the application of any small testing or reading voltage to establish the existence of a conductive path. The reading voltage should be less than the voltage potential which produces enough current to cause disruption of the electrically conductive path. Conductance in the created paths follows Ohm's law, the current flow being proportional to the electromotive force applied. The electrical resistance of the path formed depends on the magnitude of the applied voltage pulse and on the thickness of the layered composition as well as on the kind, particle size and amount of filler particles. In general, resistance is decreased by increasing the activating voltage above the critical threshold level for activation, by using larger particles and by using metal particles with higher inherent conductivity. It can also be decreased by reducing the size of the protective series resistor, nominally maintained at 150,000 ohms, which is used to limit the current which flows when the activating voltage pulse is applied. Thus, a composition with any desired electrical properties within those practical with the materials used can be obtained from a wide variety of combinations of applied potential and current and size, type and amount of filler particle.

The wire like electrically conductive paths which are produced as described above normally have lateral widths not much wider than the diameter of the filler particles that bridge or join in a chain like conductive path upon suitable electrical treatment. Path length, that is, the thickness of a layer, can be 0.1–10,000 microns as described above. In general, the shorter the path, the lower the path resistance. The width of a conductive path, however, is particle size dependent, so that one path can be very close to other paths, yet still be separated or isolated by unactivated and still insulative filler-binder composition.

In forming an array of conductive paths, multiple pairs of conductor electrodes are usually affixed permanently to the electrically activatable structure and suitable activating electrical potentials are applied to one pair at a time, to groups at a time or to all pairs of electrodes at once. Spacing may be as close as a fraction of a mil, for example, 0.01 mil, and usually will not be greater than about 50 mils for high density packing of conductive paths. The order and timing in which conductive paths are formed between the points of contact of the pairs of conductor electrodes are not critical, but sometimes, in forming dense arrays of closely spaced paths, heat buildup during activation can impair the mechanical stability of the structure if all or even a group of paths are formed at one time. When the electrically activatable structure is a layer, pairs of electrodes are usually affixed oppositely to its top and bottom surfaces. Electrical activation then forms generally parallel, multiple conductive paths that are perpendicular to the surfaces of the layer. In general, the thinner the layer, the closer the parallel paths can be. Alternatively, both members of a pair of electrodes can be affixed to one surface of a layer so as to be adjacent but not touching. By so locating multiple pairs of electrodes on one surface, conductive paths can be formed which tend to be shallow and parallel to that surface. In such a surface array paths need not always be parallel to each other. Combinations of conductive paths on the surface and through the interior of an electrically activatable structure can be formed by selection of suitable locations for pairs of electrodes. Electrode shape, cross-sectional area, size, and form make little difference in the electrical activation step; for example, silver, copper and gold paints, copper wire (for example, No. 30 and No. 18, AWG wire size), straight pins, pressure sensitive adhesive-backed metal foils, rounded, spring loaded pressure contacts and alligator clips are useful. The cross-sectional area must be sufficiently small to permit the formation of a desired density of conductive paths so that neighboring pairs of electrodes do not touch each other. For example, No. 30 copper wire is small enough in diameter to use in forming mutually isolated conductive paths about 50 mils apart. Needle like electrodes or photographically produced electrodes are suitable to use in forming paths less than 1 mil apart.

The composition of this invention is useful in preparing a read-only memory comprising a thin layer structure having a multiplicity of closely spaced, yet isolated, paths formed by electrical activation, wherein each such path can serve as an electrically conductive connecting element of the read-only memory. The read-only memory offers means of selectively channeling information into or out of a computer. If no connecting element has been formed electrically at a certain position through the thin layer structure, no information can be transmitted to a spacially correlated diode or transistor element in a contacting array of such elements. In this way, a layer composition of this invention comprises an addressing circuit for the computer. It is important that there be no interconnection between conductive paths so that information cannot leak from one path to another or from one underlying diode or transistor element to another that should not receive input.

EXAMPLE 1

A.

The parts by weight shown in Table II of commercially available aluminum powders characterized by a smooth spherical configuration were dispersed with stirring in an N,N-dimethylacetamide solution, containing the parts by weight shown in Table II, of a high molecular weight condensation polymer of equimolecular portions of m-phenylenediamine and a mixture of 70 parts of isophthaloyl chloride and 30 parts of terephthaloyl chloride. The polymeric binder had a $T_g$ of 130°C. Each mixture was then poured onto a "Teflon" TFE film-coated plate which had been preheated to 50°C.; it was then heated to 150°C. to evaporate off the solvent and form a film. Each film was then pressed to the thickness shown in the table with a "Teflon"-coated iron which was heated to 150°C. The films are labeled A through E in the table. In the compositions used in preparing films D and E, 1 part by weight of a non-leafing but sharp edged lamellar aluminum powder was added to the mixture to determine the effect of mixing smooth and sharp edged particles on the mutual isolation of electrically conductive paths formed upon electrical activation of the film. The testing procedure for each of the film samples was as follows. A testing apparatus which allowed two electrically conductive paths to be formed about 50 mils apart at the breakdown potential (BDV) shown in the table produced a path of resistance $R_{12}$ ohms between the first pair of opposed electrodes and $R_{34}$ ohms between the second pair of electrodes. The resistance measurements were made using a Keithley Model 200B D.C. Electrometer with a Model 2000 current shunt. In all films the resistance $R_{23}$ between the two paths was measured and exceeded $10^{12}$ ohms, thereby establishing complete mutual isolation of closely spaced, electrically conductive paths formed by electrical treatment of the prepared compositions. The presence of sharp edged particles in equal parts by weight with smooth, round spherical particles did not disrupt the isolation of paths.

TABLE II

| Film Composition | Binder/Filler (parts by wt.) | Thickness (mils) | BDV (volts) | $R_{12}$ (ohms) | $R_{34}$ (ohms) | Total Tested | No. of $R_{23=x}$ | % $R_{23=x}$ |
|---|---|---|---|---|---|---|---|---|
| (A) | 0.4/8 | 18 | 300 | 25 | 50 | 6 | 6 | 100 |
| (B) | 0.15/2 | 30 | 150–500 | 200 | 1,500 | 40 | 40 | 100 |
| (C) | 0.15/2 | 34 | 400–500 | 65 | 89 | 6 | 6 | 100 |
| (D) | 0.23/1* | 25 | 2–50 | 100 | 350 | 6 | 6 | 100 |
| (E) | 0.23/1* | 58 | 300–400 | 450 | 600 | 6 | 6 | 100 |

*contains also 1 part of sharp edged powder

B.

Part A was repeated using the weight ratios shown in Table III of a non-leafing but sharp edged aluminum powder. The resistance $R_{23}$ between conductive paths 50 mils apart fell to less than $10^{12}$ ohms for the percentage of the trials indicated.

It is concluded from the above data that the compositions of Part A are suitable for use in preparing a thin layer structure in which a multiplicity of closely spaced, isolated conductive paths can be formed by electrical activation, and that each such path formed can serve as a connecting element in a read-only memory. In contrast, the compositions of Part B containing sharp edged particles are unsuitable for dependable performance in computer applications without cross-talk.

TABLE III

| Film Composition Binder/Filler (parts by wt.) | Thickness (mils) | BDV (volts) | $R_{12}$ (ohms) | $R_{34}$ (ohms) | Total Tested | No. of $R_{23=x}$ | % $R_{23=x}$ |
|---|---|---|---|---|---|---|---|
| 0.15/1.5* | 30–20 | 150–250 | 50 | 100 | 9 | 7 | 78 |
| 0.23/1.5 | 30–35 | 200 | 2,000 | 5,000 | 6 | 3 | 50 |
| 0.23/1.5 | 10–12 | 150 | 2,000 | 3,000 | 6 | 6 | 100 |
| 0.23/1 | 33 | 250 | 750 | 1,100 | 6 | 4 | 67 |
| 0.3/1 | 35 | 300 | 700 | 2,000 | 6 | 4 | 67 |

*film obtained by melt pressing

EXAMPLE 2

Additional mixtures of smooth edged and sharp edged particles were dispersed in the polymeric binder solution and cast into films as described in Example 1. Two pairs of opposing contacting electrodes (No. 30 copper wire) were then positioned 50 mils apart on the opposite surfaces of each of the prepared film samples. Electrical activation of two conductive paths through each film was achieved by applying a fixed 300 volt breakdown potential first between one pair of the opposing electrodes and then between the second pair of opposing electrodes. Table IV shows the average thickness in mils of multiple films of each composition, the average path resistances in ohms of the two paths formed by applications of the 300 volt electrical potential, the number of films of each composition tested for path isolation, the % of pairs of paths that exhibited complete mutual isolation and the % of smooth edged particles (based on total weight of filler particles). Evaluation of test results in the table shows that as little as 30% of smooth edged particles in a mixture of smooth edged and sharp edged filler particles is effective in establishing complete mutual isolation of spaced apart conductive paths.

TABLE IV

| Film Composition Binder/Filler$_1$/Filler$_2$ (wt.%) | Thickness (mils) | $R_{12}$ (ohms) | $R_{34}$ (ohms) | No. of Trials | % of Trials With Isolation | Wt.% Smooth Particles |
|---|---|---|---|---|---|---|
| 13/9/78 | 22 | 310 | 330 | 8 | 62.5 | 10 |
| 14/17/69 | 28 | 350 | 340 | 7 | 71.4 | 20 |
| 7/28/65 | 27 | 340 | 340 | 6 | 100.0 | 30 |
| 13/35/52 | 28 | 340 | 290 | 7 | 100.0 | 40 |
| 7/37/56 | 23 | 260 | 320 | 7 | 100.0 | 40 |
| 7/74/19 | 21 | 100 | 300 | 7 | 100.0 | 80 |

Filler$_1$=smooth particle
Filler$_2$=sharp particle

EXAMPLE 3

The film preparation technique and testing procedure of Example 1 were repeated using three aluminum powders of different particle size as fillers. The aluminum powders passed 100% through 100-mesh, 200-mesh and 325-mesh screens (U.S. Sieve Series), respectively. The powders were examined by taking stereoscan electron microscope photographs and each showed a spheroidal particle shape with round smooth surfaces, some particles being elongated sufficiently to be cigar shaped. When subjected to testing as in Example 1, complete mutual isolation of closely spaced, electrically conductive paths about 50 mils apart was obtained. The data are shown in Table V.

TABLE V

| Film Composition Binder/Filler (parts by wt.) | Thickness $R_{(volts)}$ | BDV (ohms) | $R_{12}$ (ohms) | $R_{34}$ Tested | Total $R_{23=x}$ | No. of $R_{23=x}$ | % |
|---|---|---|---|---|---|---|---|
| 0.15/2 (100 mesh) | 35 | 250–400 | 15 | 80 | 7 | 7 | 100 |
| 0.15/2 (200 mesh) | 30–45 | 250–300 | 25 | 300 | | | |
| 13 | 13 | 100 | | | | | |
| 0.15/2 (325 mesh) | 55 | 450 | 7,000 | 15,000 | 6 | 6 | 100 |

EXAMPLE 4

Additional film compositions having the same parts by weight of aluminum to binder as in Example 3 can be prepared using a polyamic acid as an intermediate in the formation of a polyimide binder. To do this, suitable amounts of the 100-, 200- and 300-mesh aluminum powders of Example 3 are each dispersed in 16.5% solutions of a commercially available polyamic acid ("Pyre-M.L." Wire Enamel RC-5057, 15.2% converted polymer solids) in N-methyl-2-pyrrolidone carrier solvent. The three enamel dispersions are cast onto a smooth surface and heated at 135°C. for 0.5 hour, then at 300°C. for 1 hour to complete the formation of the polyimide binder for the dispersed aluminum particles and to evaporate off the carrier solvent and the water of condensation (formed during conversion of polyamic acid to polyimide). The resulting cured films are suitable as thin layered structures in which a multiplicity of closely spaced, isolated paths can be formed by electrical activation (as described in Example 1)

and can serve as connecting elements for read-only memories.

The embodiments of the invention in which an exclusive property or privilege is claimed are defined as follows:

1. Dielectric composition comprising a dielectric organic polymeric binder and normally dielectric filler particles of aluminum having a tarnish film of aluminum oxide as a dielectric surface coating thereon dispersed therein, at least 30 weight % of said filler particles having smooth rounded edges and the polymer of said organic polymeric binder having a glass transition temperature of at least 40°C., which composition is useful as a dielectric material and, in layered form, upon electrical activation, provides a multiplicity of closely spaced, mutually isolated electrically conductive paths.

2. Dielectric composition disposed as a layered structure having a thickness of 0.1–10,000 microns and an electrical resistance of at least $10^8$ ohms, which layered structure provides a multiplicity of closely spaced, mutaully isolated electrically conductive paths upon electrical activation, said composition comprising a dielectric polymeric binder and normally dielectric filler particles dispersed therein, said filler particles having an electrically conductive metal or semiconductor interior and a dielectric surface coating comprising an insulative chemical compound of the metal or semiconductor, at least 30 weight % of said filler particles having smooth rounded edges, the polymer of said polymeric binder being an organic polymer having a glass transition temperature of at least 40°C.

3. The layered structure of claim 2 wherein the composition comprises 10–65 volume % of binder and 35–90 volume %, to total 100 volume %, of filler particles, said filler particles being spheroidal or nodular metal particles having an average size of 0.01–1,000 microns, said polymer having a glass transition temperture of at least 100°C.

4. The structure of claim 3 wherein the filler particles are aluminum particles, at least 50 weight % of which have smooth rounded edges and an average size of 0.01–0.5 micron.

5. The structure of claim 3 wherein the polymer is a polyamide.

6. The structure of claim 3 wherein the polymer is a polyimide.

7. The structure of claim 4 comprising 15-55 volume % of binder and 45-85 volume %, to total 100 volume %, of spheroidal aluminum particles.

8. The structure of claim 3 wherein the amount of binder is 15–55 volume % and the amount of filler particles is 45–85 volume %.

* * * * *